US012491594B1

(12) United States Patent
Soring

(10) Patent No.: US 12,491,594 B1
(45) Date of Patent: Dec. 9, 2025

(54) MORTISE AND TENON ALIGNMENT JIG

(71) Applicant: Eric Soring, Glen Mills, PA (US)

(72) Inventor: Eric Soring, Glen Mills, PA (US)

( * ) Notice: Subject to any disclaimer, the term of this patent is extended or adjusted under 35 U.S.C. 154(b) by 473 days.

(21) Appl. No.: 18/143,626

(22) Filed: May 5, 2023

Related U.S. Application Data

(60) Provisional application No. 63/424,962, filed on Nov. 14, 2022.

(51) Int. Cl.
*B23Q 9/00* (2006.01)
*B25H 7/00* (2006.01)
*B27F 5/02* (2006.01)

(52) U.S. Cl.
CPC ............. *B23Q 9/0042* (2013.01); *B25H 7/00* (2013.01); *B27F 5/02* (2013.01)

(58) Field of Classification Search
CPC ...... B23Q 9/0042; B23Q 9/0014; B25H 7/00; B25H 7/02; B27F 5/02; B27F 5/00; B27F 1/00; B27F 1/08; B27F 1/005; B27F 1/02
USPC .............................................. 33/41.1; 30/358
See application file for complete search history.

(56) References Cited

U.S. PATENT DOCUMENTS 2,399,145 A 4/1946 Schmidt
2,422,367 A 6/1947 Quigley
2,500,800 A * 3/1950 Carlson ............... E05D 11/0009 30/167.1
2,809,440 A 10/1957 Schlage
2,819,668 A * 1/1958 Mcaneny ................. B41K 1/30 101/368
4,235,268 A * 11/1980 Savary ..................... B25D 3/00 30/167
4,595,040 A * 6/1986 Glisman .............. B23Q 9/0042 409/130
5,133,254 A * 7/1992 Kirkwood ................ D06Q 1/00 101/399
5,511,312 A * 4/1996 Hobbs ....................... B27F 5/10 30/167.1
5,669,153 A 9/1997 Hood
6,267,162 B1 * 7/2001 Wilske ...................... B27F 5/12 30/167.1
8,522,445 B1 9/2013 Scribante
9,085,079 B2 7/2015 Manohar
2002/0112354 A1 8/2002 Camillo et al.

FOREIGN PATENT DOCUMENTS

DE 202009003628 6/2009

OTHER PUBLICATIONS

Woodpeckers Morty Loose Tenon Joinery Jig Owner's Manual. www.woodpeck.com/morty-loose-tenon-jig.html. Mar. 7, 2022.

* cited by examiner

*Primary Examiner* — Phong H Nguyen
(74) *Attorney, Agent, or Firm* — Joseph E. Maenner; Maenner & Associates, LLC

(57) ABSTRACT

A mortise and tenon alignment jig includes a generally oblong body having a first straight longitudinal side, an opposing, second straight longitudinal side, a first semi-circular end portion connecting first ends of each of the first and second sides, and a second semi-circular end portion connecting second ends of each of the first and second sides. A top face has a lip extending outwardly of the body. A raised imprint surface is formed on a top of the top face. The imprint surface has a central gap and four orthogonally spaced arms extending outwardly from the central gap.

6 Claims, 9 Drawing Sheets

MORTISE AND TENON ALIGNMENT JIG

CROSS-REFERENCE TO RELATED APPLICATION

The present application claims the benefit of U.S. Provisional Patent Application Ser. No. 63/424,962, filed on Nov. 14, 2022, which is incorporated herein by reference in its entirety.

BACKGROUND OF THE INVENTION

Field of the Invention

The invention relates to a jig that is used to cut mortise and tenon joints while woodworking.

Description of the Related Art

Mortise and tenon joints are used to join two adjacent pieces of wood or other material such that the joining interface is not visible, leading to a more aesthetically pleasing look in a finished product. A mortise and tenon joint furnishes a strong outcome and typically connects by either gluing or locking into place. One drawback to this joint is the difficulty in making it because of the precise measuring and tight cutting required.

It would be beneficial to provide a jig to correctly align mortise holes for insertion of a connecting tenon.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a mortise and tenon alignment jig including a generally oblong body having a first straight longitudinal side, an opposing, second straight longitudinal side, a first semi-circular end portion connecting first ends of each of the first and second sides, and a second semi-circular end portion connecting second ends of each of the first and second sides. A top face has a lip extending outwardly of the body. A raised imprint surface is formed on a top of the top face. The imprint surface has a central gap and four orthogonally spaced arms extending outwardly from the central gap.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
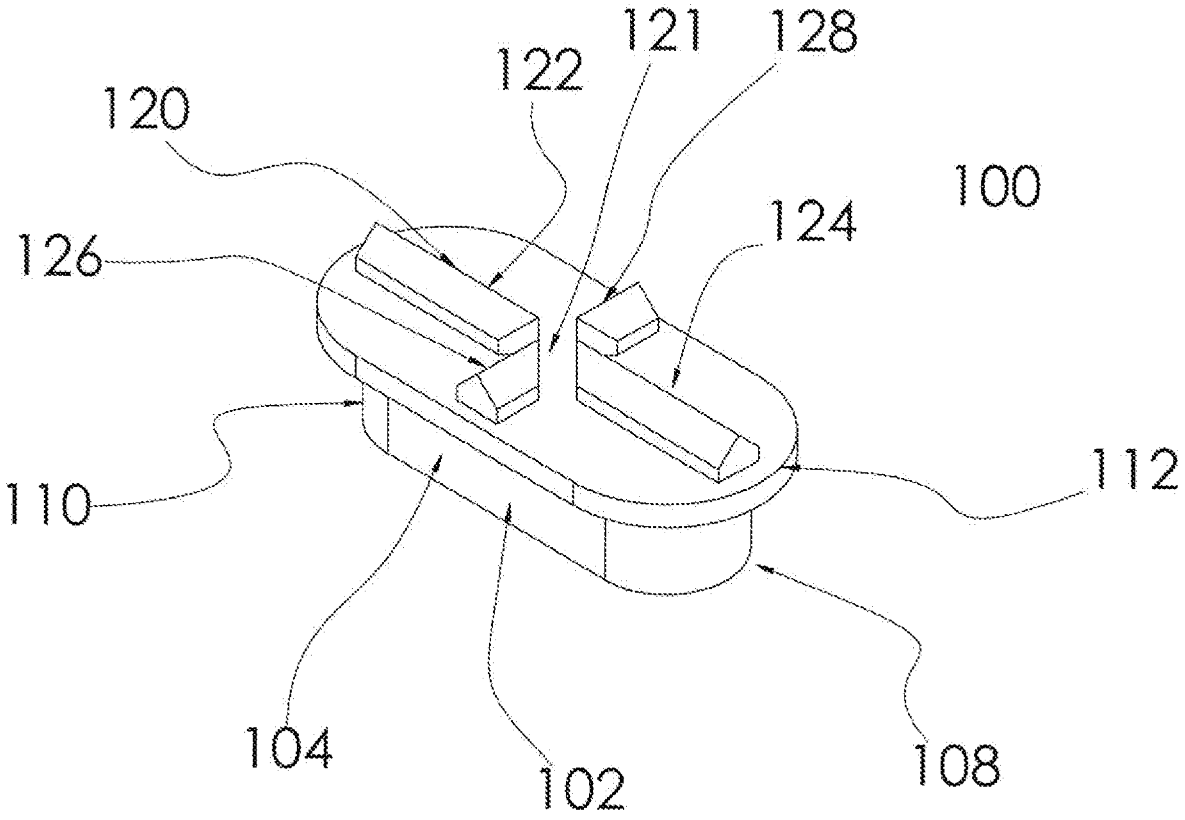
FIG. 1 is a perspective view of a mortise and tenon alignment jig according to a exemplary embodiment of the present invention.
Figure 2:
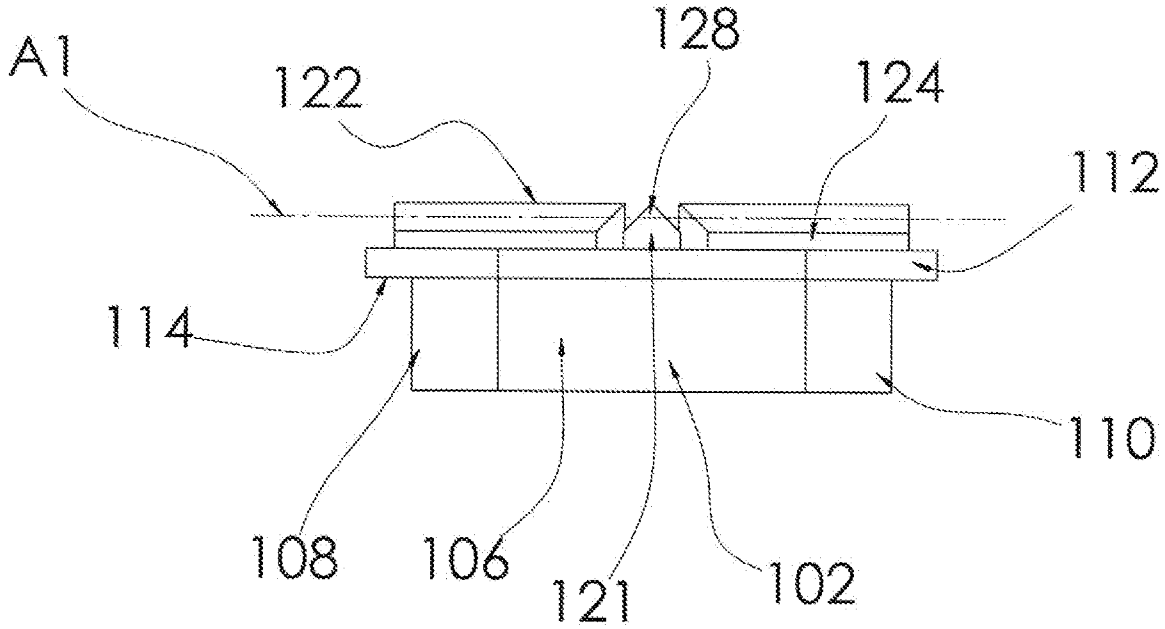
FIG. 2 is a side elevational view of the jig of FIG. 1.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

In its most basic form, a mortise and tenon joint is both simple and strong. There are many variations of this type of joint, and the basic mortise and tenon has two components: the mortise hole ("mortise"), and the tenon tongue ("tenon").

A non-circular mortise is formed in a first member. The tenon, formed on the end of a second member generally referred to as a rail, fits into the mortise cut into the first member. The tenon is cut to fit the mortise exactly. The tenon usually has shoulders that seat when the joint fully enters the mortise. The joint may be glued, pinned, or wedged to lock it in place.

Alternatively, a first non-circular mortise is cut into the first member and a second mortise hole, identical in size and shape to the first mortise hole, is cut into the second member. A separate tenon is used, with a first end of the tenon inserted into the first mortise and a second end of the tenon inserted into the second mortise. This method is particularly difficult to use because the first and second mortises must be aligned in both a horizontal and vertical direction, as well as at a common angle relative to each member. The present invention can be used to reduce the difficulty in forming a mortise and tenon joint with two mortises and a separate tenon.

Figure 5:
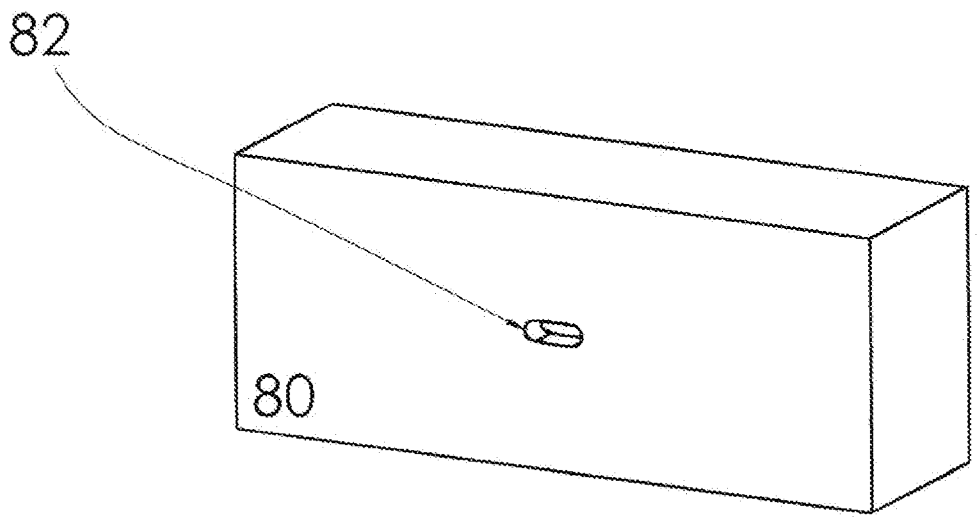
FIG. 5 is a perspective view of a mortise in a first material into which the jig of FIG. 1 can be inserted.
Figure 6:
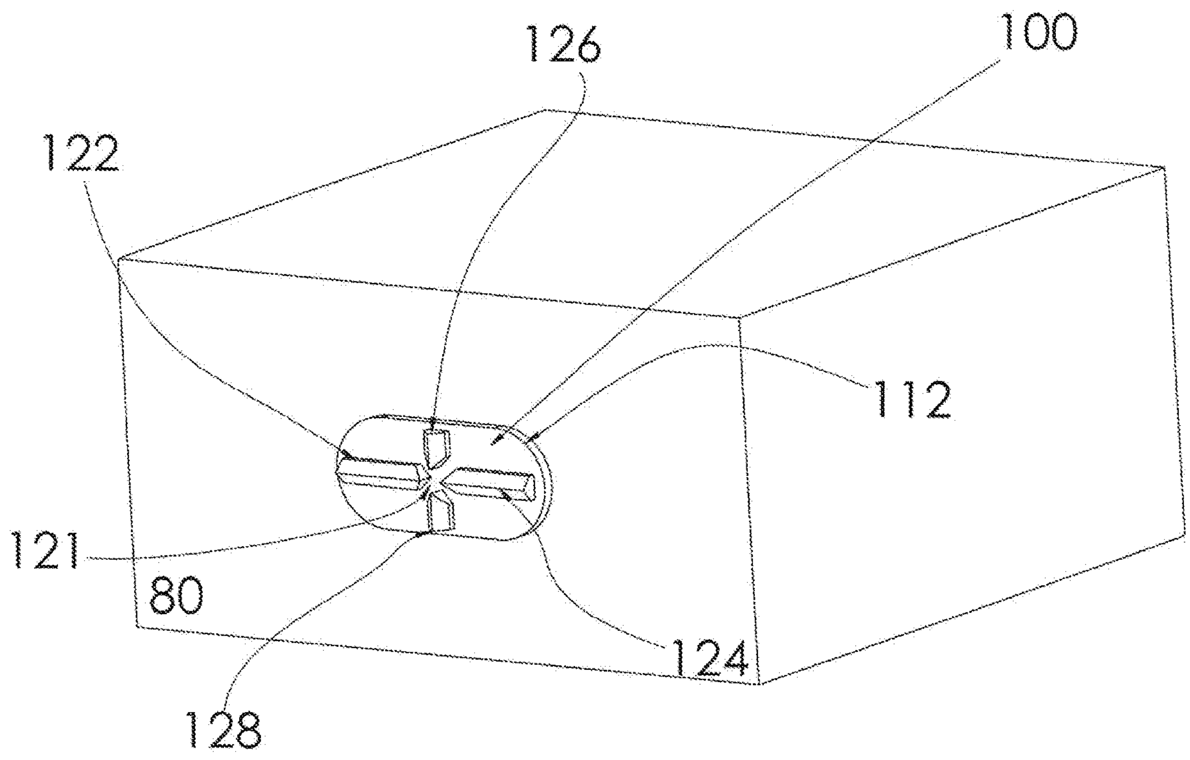
FIG. 6 is a perspective view of the jig of FIG. 1 inserted into the mortise of FIG. 5.

Referring to FIGS. 1-4, an alignment jig 100 ("jig 100") for making a mortise in a piece of wood, laminate, or other material is shown. While jig 100 can be used with materials other than wood, the material used will be described herein simply as "material". Jig 100 can typically be manufactured from a metal, such as aluminum, zinc, lead, or other suitable metal. Jig 100 is sized to fit into an existing mortise 82 formed in a first material 80, as shown in FIGS. 5 and 6. Mortise 82 can be formed by an existing mortising tool, as will be recognized by those skilled in the art.

Referring back to FIGS. 1-4, jig 100 includes a generally oblong body 102 having a first straight longitudinal side 104, an opposing, second straight longitudinal side 106, a first semi-circular end portion 108 connecting first ends of each of the first and second sides 104, 106, and a second semi-circular end portion 110 connecting second ends of each of the first and second sides 104, 106. An oblong shape is chosen to match the oblong cross-section of a standard tenon. Jig 100 can be provided in different sizes, with different lengths of sides 104, 106 and/or different radii of curvature of end portions 108, 110 to match the size of the tenon being used.

Jig 100 includes a top face 112 having a lip 114 that extends outwardly of body 102. Lip 114 allows body 102 to be inserted into existing mortise 82 while lip 114 rests on the top surface of first material 80 to make it easier for a user to grasp and remove jig 100 from mortise 82 after use.

Figure 8:
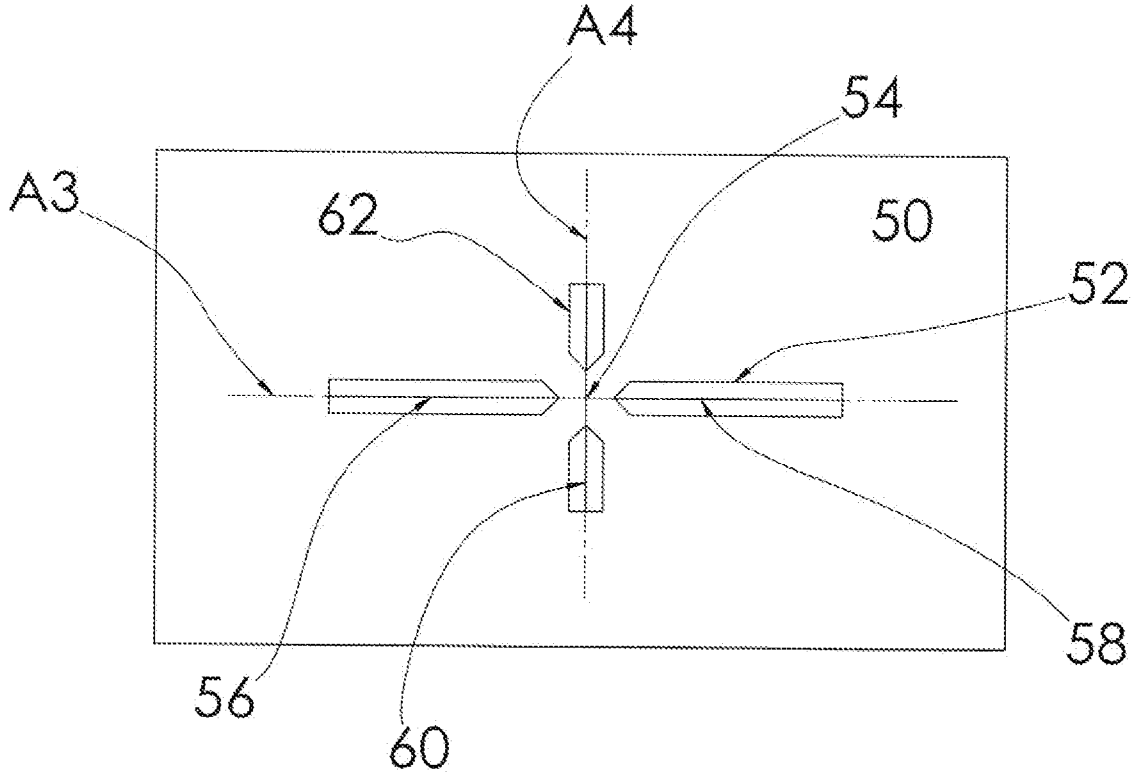
FIG. 8 is a top plan view of an imprint formed by the jig of FIG. 1 into the second material.

A raised imprint surface 120 is formed on top of top face. Imprint surface 120 is used to form an imprint 52 on a second material 50, as shown in FIG. 8. Imprint surface 120 includes a central gap 121 and four orthogonally spaced arms extending outwardly from central gap 121. First and second longitudinal arms 122, 124 extend lengthwise along a central longitudinal axis A1 that extends through central gap 121. Similarly, first and second lateral arms 126, 128 extend widthwise along a central lateral axis A2 that also extends through central gap 121.

Figure 3:
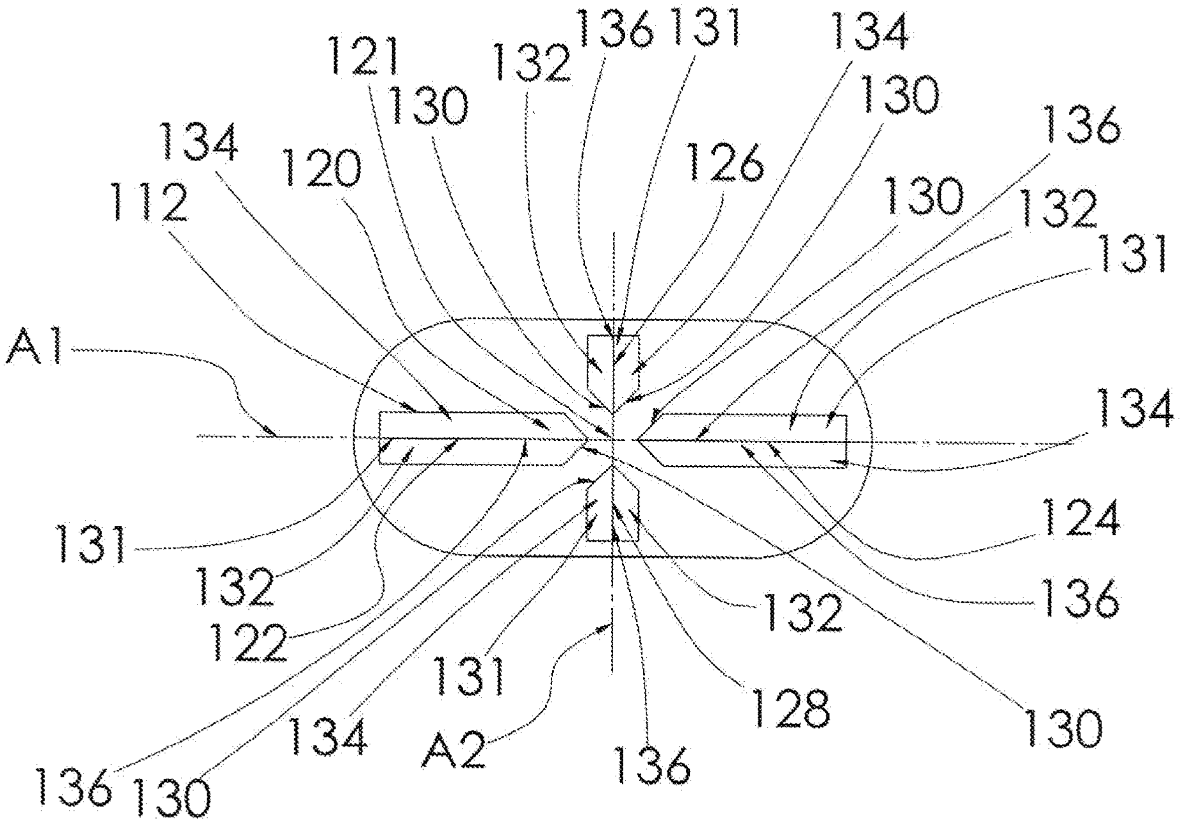
FIG. 3 is a top plan view of the jig of FIG. 1.
Figure 4:
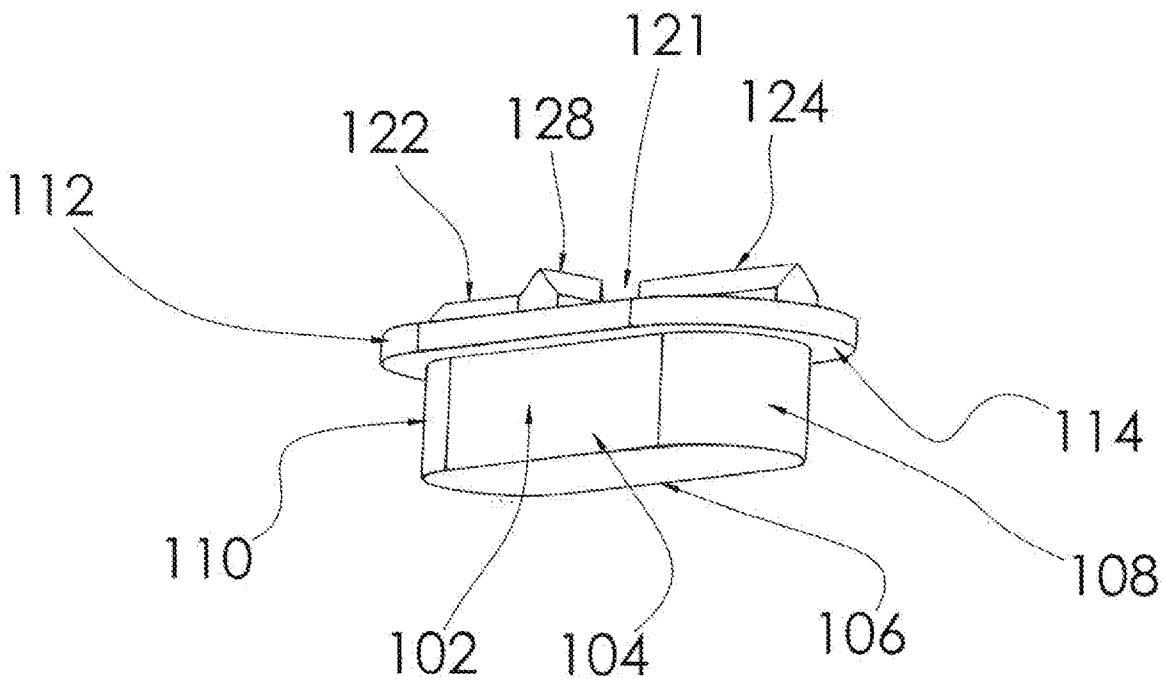
FIG. 4 is a bottom perspective view of the jig of FIG. 1.

Referring to FIG. 3, each arm 122, 124, 126, 128 has a triangular face 130 that faces central gap 121. Additionally, each arm 122, 124, 126, 128 has a tapered top face 131 with two sides 132, 134 that form a point 136. The continuum of points 136 extending along each arm 122, 124, 126, 128 forms line contact that allows jig 100 to bite into second material 50 to form imprint 52.

It is desired that axes A1, A2 extend orthogonally to each other so that, when jig 100 is used, orthogonal longitudinal and lateral axes A3, A4, respectively, are formed in second material 50, as shown in FIG. 8. Axes A3, A4 extend orthogonal to each other from a central point 54. Longitudinal imprints 56, 58 are formed by longitudinal arms 122, 124, respectively, and lateral imprints 60, 62 are formed by lateral arms 126, 128, respectively.

Figure 7:
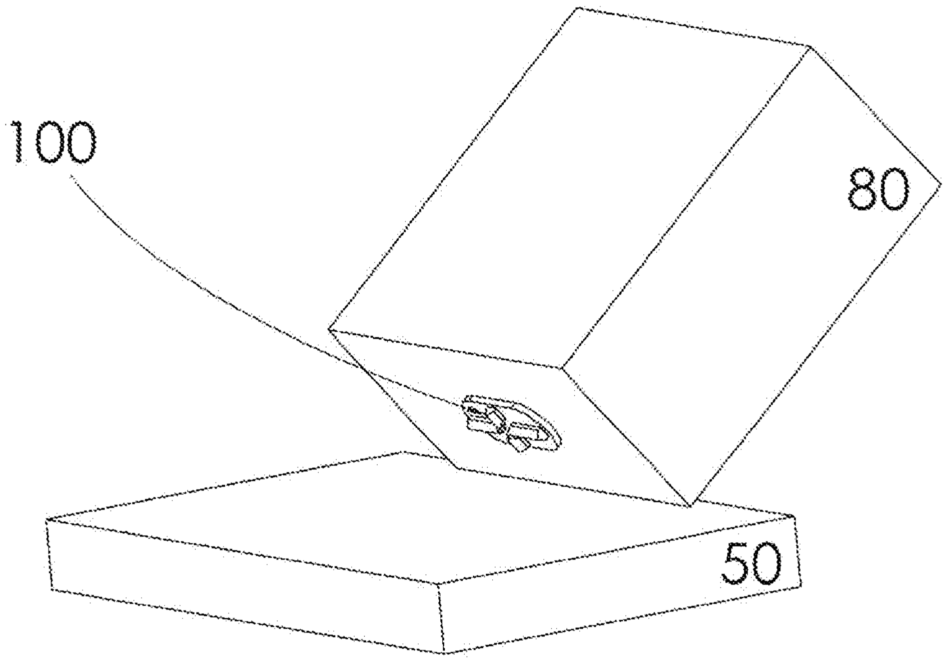
FIG. 7 is a perspective view of the first material with the jig of FIG. 1 being aligned with a second material.

To use jig 100, jig 100 is inserted into existing mortise 82 in first material 80. As shown in FIG. 7, first material 80 is aligned over top of second material 50 in a desired location to form a second mortise in second material 50. When jig 100 is in place over second material 50, first material 80 is pressed toward second material 50 to form imprint 52, as shown in FIG. 8. The pressing can be done using a mallet strike on top of first material 80, distal from jig 100. Alternatively, first and second materials 80, 50 can be placed together into a press and compressed toward each other using the press. Those skilled in the art will recognize that other methods can be used to press materials 50, 80 together to form imprint 52.

Figure 9:
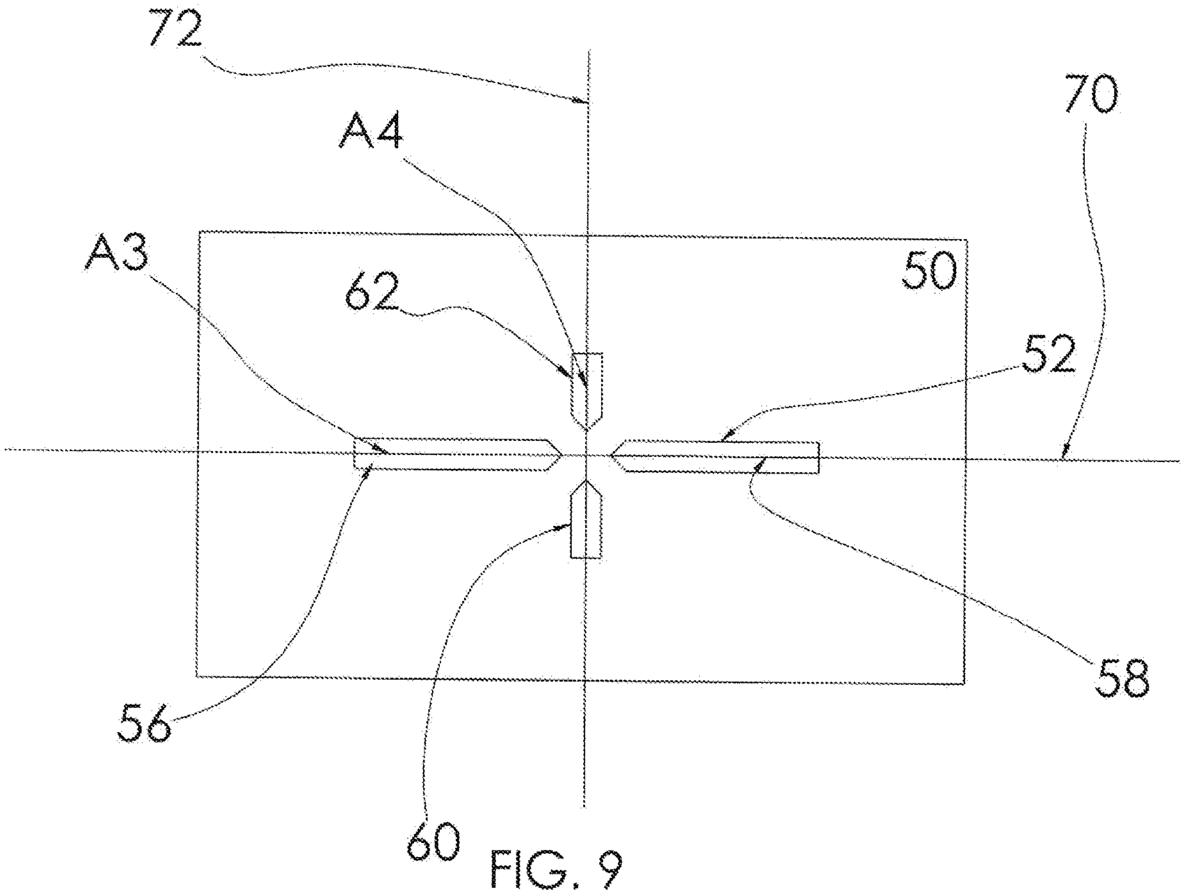
FIG. 9 is a top plan view of longitudinal and lateral axes formed in the imprint of FIG. 8 being extended.

After the imprint 52 is formed in second material 50, longitudinal and lateral axes A3, A4 can be extended, as shown in FIG. 9, by drawing lines 70, 72 along imprints 56/58 and 60/62, respectively. Lines 70, 72 are orthogonal to each other and are used to align a mortising tool (not shown) on top of second material so that a mortise formed in second material 50 by the mortising tool is properly aligned in the longitudinal and lateral directions as well as angularly with respect to mortise 82 in first material 80 such that, when the second mortise is formed, the second mortise aligns with first mortise 82 so that a tenon can be properly inserted into both first mortise 82 and the second mortise to join first material 80 and second material 50 to each other.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A mortise and tenon alignment jig comprising:

a generally elongate body having a first straight longitudinal side, an opposing, second straight longitudinal side, a first semi-circular end portion connecting first ends of each of the first and second sides, and a second semi-circular end portion connecting second ends of each of the first and second sides;

a top face having a lip extending outwardly of the body;

a raised imprint surface formed on a top of the top face, the imprint surface comprising a central gap and a plurality of arms extending outwardly from the central gap;

wherein the jig is sized and shaped to fit into an existing mortise; and wherein the plurality of arms consists of four arms.

2. The mortise and tenon jig according to claim 1, wherein each of the plurality of arms is orthogonally spaced from each adjacent of the plurality of arms.

3. The mortise and tenon jig according to claim 2, wherein a first of the plurality of arms and a second of the plurality of arms, opposite from the first of the plurality of arms extend along a central common longitudinal axis.

4. The mortise and tenon jig according to claim 3, wherein a third of the plurality of arms and a fourth of the plurality of arms extend along a central lateral axis extending orthogonally to the central longitudinal axis.

5. The mortise and tenon jig according to claim 1, wherein each of the plurality of arms has a tapered top face.

6. The mortise and tenon jig according to claim 1, wherein the body is generally oblong in shape.

* * * * *